United States Patent [19]

Wedell

[11] Patent Number: 5,065,988
[45] Date of Patent: Nov. 19, 1991

[54] SPRING FOR COMPRESSION AND TENSION, MAINLY IN AXIAL DIRECTION

[76] Inventor: Anders S. Wedell, Munkegaardsvej 2A, Dk-3490 Kvistgaard, Denmark

[21] Appl. No.: 460,199
[22] PCT Filed: Aug. 11, 1987
[86] PCT No.: PCT/DK88/00133
§ 371 Date: Mar. 14, 1989
§ 102(e) Date: Mar. 14, 1989
[87] PCT Pub. No.: WO89/01577
PCT Pub. Date: Feb. 23, 1989

[30] Foreign Application Priority Data

Aug. 11, 1987 [DK] Denmark ............................ 4172/87

[51] Int. Cl.[5] ................................................. F16F 1/36
[52] U.S. Cl. .................................... 267/149; 267/153; 267/158; 267/165
[58] Field of Search ................. 267/162, 165, 153, 166, 267/122, 148, 149, 158, 144, 145, 292, 69; 188/371; 248/562, 636

[56] References Cited

U.S. PATENT DOCUMENTS

| 3,036,180 | 5/1962 | Greenwood | 267/122 X |
| 3,272,491 | 9/1966 | Knittel | 267/145 |
| 3,444,962 | 5/1969 | Lech | 188/371 |
| 3,989,232 | 11/1976 | Steinbach et al. | 267/122 X |
| 4,235,427 | 11/1980 | Bialobrzeski | 267/153 |
| 4,512,209 | 4/1985 | Linnemeier | 188/371 X |
| 4,815,663 | 3/1989 | Tada | 267/165 X |
| 4,832,320 | 5/1989 | Scowen et al. | 267/148 X |
| 4,905,972 | 3/1990 | Scowen | 267/165 X |
| 4,927,124 | 5/1990 | Spedding et al. | 267/165 X |

FOREIGN PATENT DOCUMENTS

| 3536661 | 4/1986 | Fed. Rep. of Germany . |
| 3515525 | 11/1986 | Fed. Rep. of Germany . |
| WO8700252 | 1/1987 | World Int. Prop. O. . |
| WO8706986 | 11/1987 | World Int. Prop. O. . |
| WO8803617 | 5/1988 | World Int. Prop. O. . |

Primary Examiner—Douglas C. Butler
Attorney, Agent, or Firm—Fleit, Jacobson, Cohn, Price, Holman & Stern

[57] ABSTRACT

A spring for compression and tension mainly in an axial direction and made of a material having a Young's modulus of elasticity of at least 39 GPa, such as metal, steel, glass, plastic or reinforced plastic is disclosed. The spring is in the form of a tube or ring of generally constant thickness. In cross-section, each ring is made up of oppositely directed inner and outer U-shaped spring parts with contiguous axial projections. A spring is provided which has minimal elastic hysteresis.

13 Claims, 4 Drawing Sheets

SPRING FOR COMPRESSION AND TENSION, MAINLY IN AXIAL DIRECTION

BACKGROUND OF THE INVENTION

The invention relates to a spring for compression and tension, mainly in axial direction, which spring is made of a material having a Young's modulus of elasticity E, which is at least 39 GPa, such as metal, steel, glass, plastic or reinforced plastic, the spring being rotation symmetrical around a symmetry axis and in the form of a tube or a ring, the material thickness of the spring wall between the end sections of the spring being practically constant. The spring, in its length direction, comprises at least two mutually integrated spring parts, in radial direction oppositely directed, and in cross section half-wave or U-shaped.

A U-shaped spring is known from German published patent application DE-AS 35 36 661, where FIG. 10 shows a rotation symmetrical U-shaped spring, where the wall of the spring has a practically constant thickness of material. The axial ends of this spring loosely abut a cylindrical ring, and consequently there must be radial exterior or interior guiding surfaces to keep the spring in position. Such an interior or exterior guiding surface gives a friction, when the spring moves, and consequently a certain hysteresis loop.

Known are also springs shaped like bellows, which tightfitting confine a temperature expanding medium or a movement suppressing medium, and a common purpose for these types of springs are to obtain a flexibility as large as possible with a spring resistance as small as possible, since the compressive force mainly has to be generated by the medium confined in the spring.

SUMMARY OF THE INVENTION

The spring according to the present invention is characterized in that each end section of the spring comprises an annular axial rigid projection extending between the diameters of the wave crests of the two nearest half wave formed spring parts, through which projection a neutral surface of the spring is passing. By that means it has appeared that a spring may be obtained with a hysteresis loop substantially smaller than the hysteresis loop of U-shaped springs made of the same material and having the same thickness of material. Presumably this is due to the line of the centres of gravity of the axial cross sections of the spring passing through or very close to the axial end projections of the spring, and thereby simultaneously the neutral surface of the spring is passing through or close to the axial end projections of the spring. The neutral surface of the spring is an imaginary surface and may be defined as a stress neutral or stress balanced surface, in relation to which the bending stresses occurring radially outside the surface are equal to and opposite directed to the bending stresses occurring radially inside the surface during the increasing, decreasing or stationary load of the spring. This neutral surface of the spring may be a cylinder surface, a cone surface, an hour-glass shaped surface or a vase shaped surface depending on the performance of the spring. Compression or tension stresses are of course not zero in the neutral surface. Due to the fact that the spring transfers its compressive or tensile force at its ends via the axial projections, which are situated close to the said neutral surfaces, a spring is obtained, which is substantially more uniformly balanced than the said known U-shaped spring of DE 35 36 661, and therefore the spring according to the invention shows a hysteresis smaller than the hysteresis of the known spring. Therefore springs according to the invention will be suitable in many more applications than the known similar springs, particularly where precision springs are needed in measuring instruments, where an extremely small hysteresis is important.

BRIEF DESCRIPTION OF DRAWINGS

The invention will now be described by way of example with reference to the accompanying drawings, of which.

DESCRIPTION OF PREFERRED EMBODIMENTS

Figure 1:
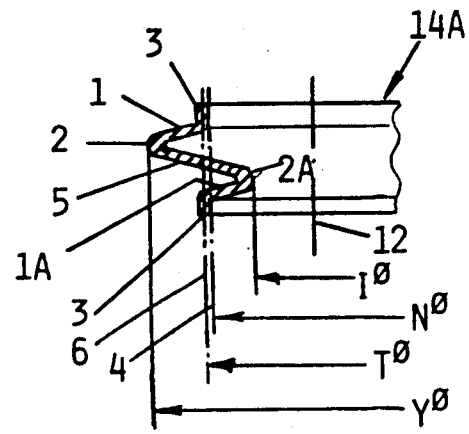
FIG. 1 shows a spring composed of two spring parts and a cylinder shaped projection at each end, the two spring parts in cross section being half wave or U-shaped in opposite directions.

FIG. 1 shows a spring 14A composed of two integrated U-shaped parts 2, 2A which, integrated herewith as well, each are provided with a cylindrical projection 3. The wave or U-shaped parts 2 and 2A each comprises two disc shaped parts 1 and 1A respectively, where the part 2A forms an outer annular groove and an inner annular wave crest, while the U-part 2 forms an outer annular wave crest and an inner annular groove.

A disc shaped part 1 in continuation of a disc shaped part 1A forms a disc shaped part 5, which via wave crests is integrately connected to the two other disc shaped parts 1, 1A, each of which carries a projection 3.

Figure 2:
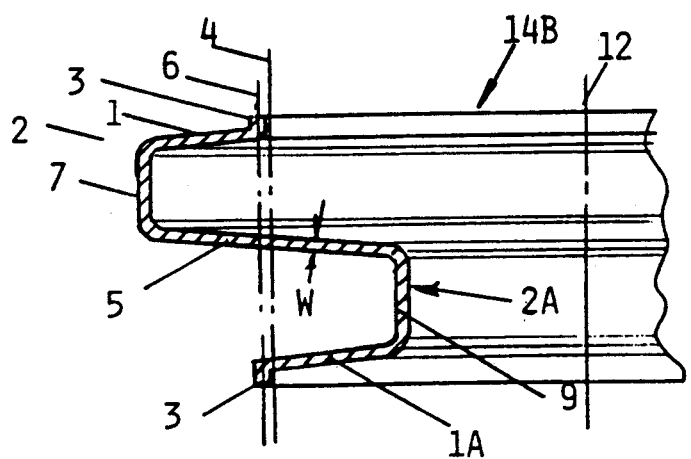
FIG. 2 shows a spring corresponding to the spring shown in FIG. 1, but where each crest of the half wave and the bottom of the U is of a cylindrical shape.

FIG. 2 shows a spring 14B corresponding to the spring shown in FIG. 1, but where each of the disc shaped parts 1, 5 and 5, 1A respectively is integrally connected to cylinder shaped parts 7 and 9, respectively. All the above mentioned disc shaped parts 1, 1A, 5 are flat or slightly cone shaped, which also includes slightly dome shaped forms, and at a zero spring load they form an angle to the spring axis 12 of $90° \pm 5°$, preferably $86.4° + 0.5°$ or $-1.0°$. Each disc shaped part is either integrally connected to the next disc shaped part 5 of the same kind and size or is integrally connected to a smaller disc shaped part 1, 1A, which has a cylinder shaped projection 3 at its free inner or outer edge. The integral connection may be direct as shown in FIG. 1 as well as indirect as shown in FIG. 2, as an example via a cylindrical part 7, 9.

Figure 3:
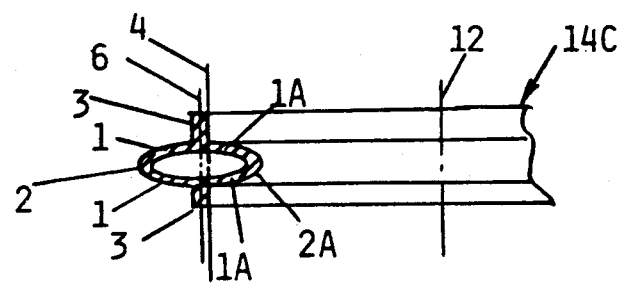
FIG. 3 shows a spring where the two U-shaped parts together form an elliptically ring or toroid shaped tube provided with two cylinder shaped projections.

FIG. 3 shows a ring shaped spring 14C with a tube shaped cross section and with opposite and integrally connected projections 3. The tube shaped cross section is composed of slightly domed disc shaped parts 1, 1A. The projections 3 are in the embodiments shown in FIGS. 1-6 preferably placed in the same distance from the spring axis 12 as the spring neutral surface 4, which in said cases are a cylindrical surface.

Figure 4:
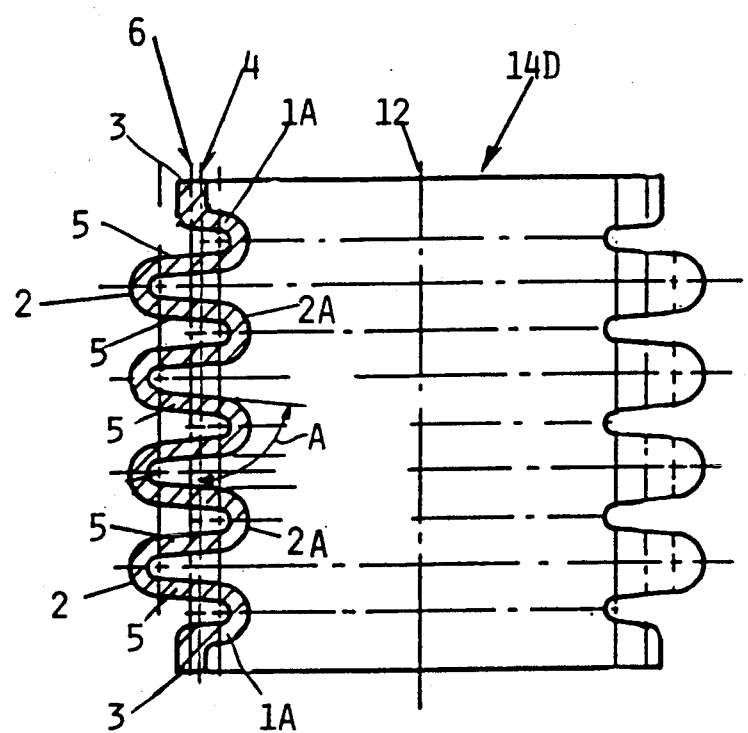
FIG. 4 shows a spring according to the invention composed of nine spring parts and a cylinder shaped projection at each end, the spring parts in cross section being half wave or U-shaped in opposite directions, the spring parts at the ends being slightly smaller than the other spring parts.
Figure 5:
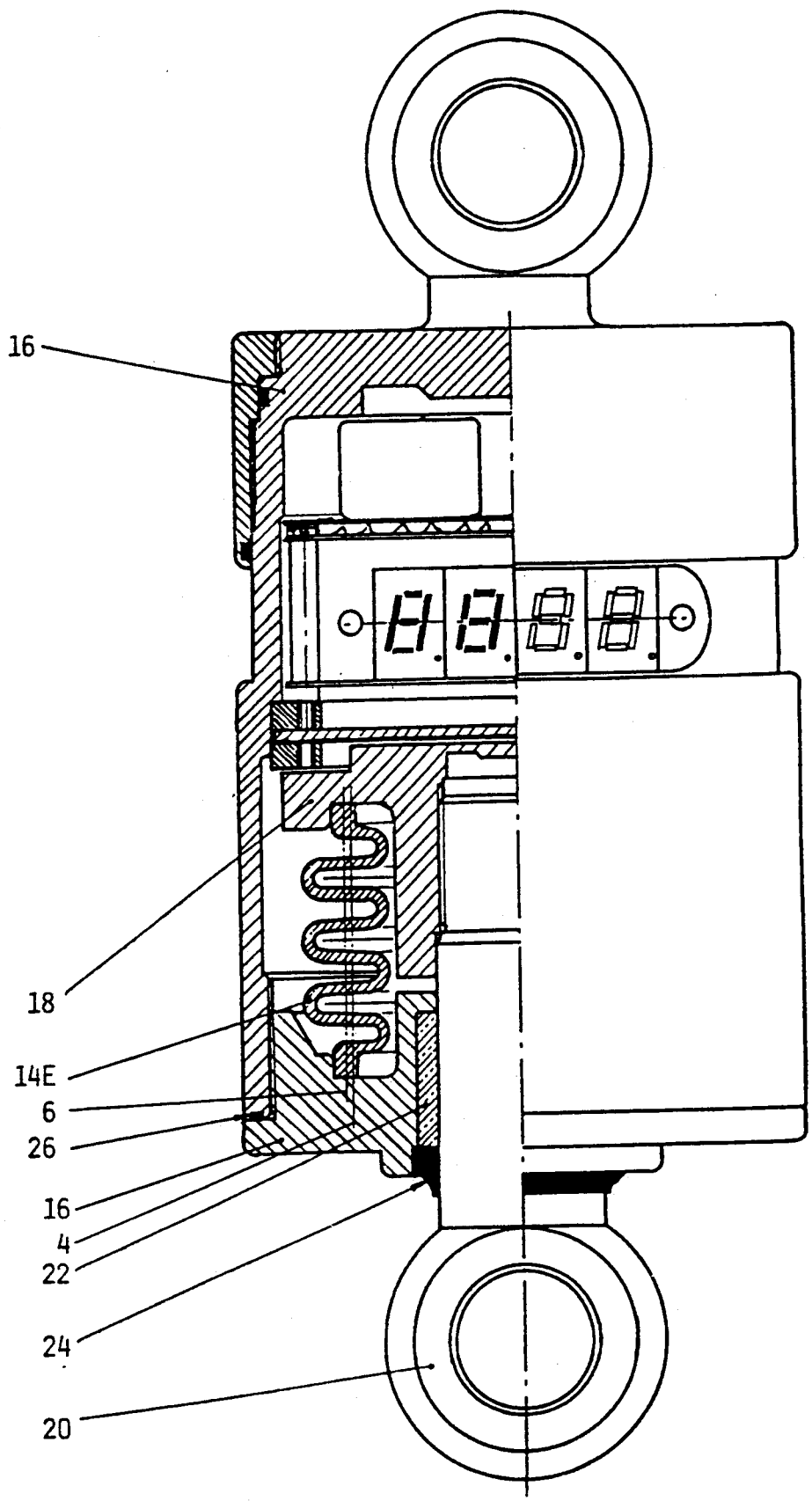
FIG. 5 shows a measuring instrument with a weighing cell in which a spring according to the invention has been utilized.

FIG. 4 shows a spring 14D having a spring travel which is larger than the travel of the embodiments shown in FIGS. 1-3, but the construction is based on the same principle. In a practical embodiment of the spring the pitch of the spring may be 12.5 mm, the material thickness of the spring parts 2.75 mm, the inner and outer diameter of the spring parts may be 45.5 mm and 78.5 mm, respectively, the diameter of the cylinder shaped neutral surface may be 62 mm, the inner and outer diameter of the projections 3 may be 58 mm and 66 mm, respectively. The height of the spring shown in FIG. 4 may e.g. be 67 mm, and the roundings in the integrated part between two disc shaped neighbouring parts 5 may have an inner radius of curvature of 1.5 mm and an outer radius of curvature of 4.25 mm. The material may be temperable steel, so that the steel may be hardened to a desired degree of hardness, when a turn out operation and cutting by cutting tools by means of FIG. 5 shows a weighing cell, in which a spring 14E according to the invention has been placed between the house 16 of the weighing cell and the part 18, which carries one of the eye hooks 20 of the weighing cell. The piston rod of the eye hook 20 may be surrounded by a bushing 22, which may be omitted, and which piston rod may be tightened outwardly by a lip sealing 24. The house 16 consists of several parts and sealed by a gasket 26.

It has appeared that by application it is possible practically to avoid the hysteresis loop which normally appears at disc springs, and this effect presumably is due to the spring not being exposed to the friction, which appears between the mutual contact faces of the disc springs and between the disc springs and their guiding means.

Figure 6:
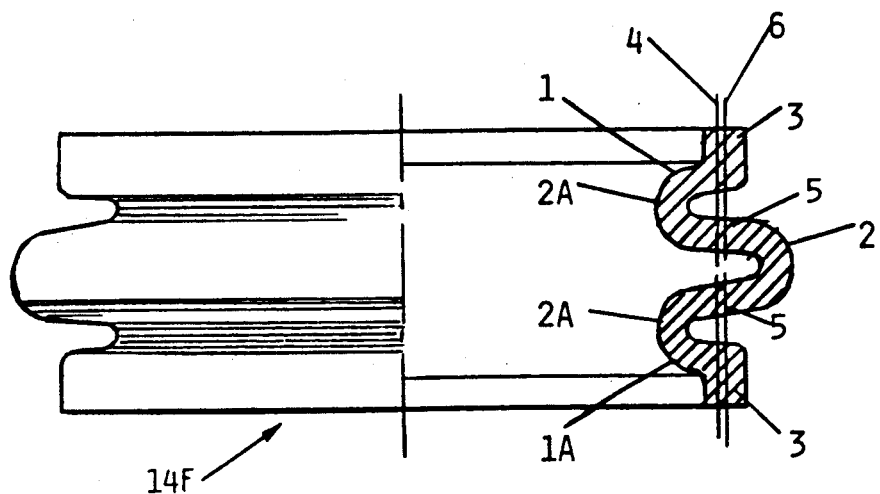
FIG. 6 shows a one and a half wave spring consisting of two radial inwardly directed wave crests and one outwardly directed wave crest, which spring has a cylindrical neutral surface and a cylindrical surface containing the centres of gravity of the cross sections.

FIG. 6 shows a spring 14F with about three half wave formed spring parts composed of disc shaped parts 1, 1A, 5 and two end projections 3 having a larger material thickness than the thickness of the wave formed spring parts. The material may be metal, steel, glass, plastic or reinforced plastic, e.g. reinforced by means of whiskers, since the Young's modulus E should only be higher than about 39 GPa. For information it is stated that the Young's modulus of steel is about 206 GPa, of quartz 72 GPa and of whiskers produced of $Al_2O_3$ 524 GPa. Experiments have shown that with an elastic material having an E value higher than 39 GPa excellent results are achieved as regards to a spring characteristic which is practically free of hysteresis within the working range of the spring.

For all the springs 14 the line 6 for centres of gravity is shown for the cross section of the spring. For cylindrical springs of wave shaped form as shown in FIGS. 1-6 this line 6 forms the generatrix of a cylindrical surface containing the centres of gravity of the cross sections. Slightly inside in radial direction of said cylindrical surface is in each of the shown springs a generatrix of the cylinder formed neutral surface of the for bending stresses in relation to which surface the bending stresses occurring radially outside the surface are as high as and oppositely directed to the bending stresses occuring radially inside said surface during an increasing, a decreasing or a constant load of the spring.

Favourable results are also obtained by strong springs 14 with a material thickness W which constitutes a relatively high percentage of the diameter Y of the spring, or of the diameter N of the tension neutral surface 4 or of the diameter T of the surface 6 containing the centres of gravity of the cross sections. Preferably, the ratio P=W:N in the whole length of the spring is selected in the range $1.5\% \leq P \leq 15\%$, in which W is the average material thickness, and N is the diameter of the neutral surface of the spring 14 in that part of the spring length where the average material thickness is W.

Such springs 14 could e.g. have a thickness of material of 4 mm and a diameter N of the neutral surface 4 of 26 mm to 270 mm and/or a diameter T of the surface 6 containing the centres of gravity of the cross sections of 28-300 mm. The axial end projections 3 may vary from the same thickness W of material as the adjacent spring part 2, 2A up to e.g. the double value of said thickness.

In some cases it has appeared appropriate having one additional half wave formed spring part 2A radially inside the neutral surface 4 of the spring 14. The lowest number of half wave formed spring parts is two with one half wave formed spring part 2A inside and one half wave formed spring part 2 outside the neutral surface.

Figure 7:
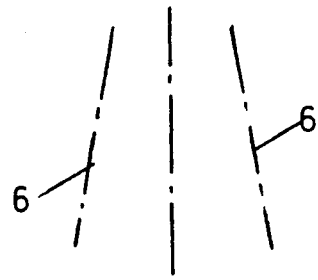
FIGS. 7, 8 and 9 show schematically the surfaces containing the centres of gravity for a wave shaped spring formed as a truncated cone, an hour glass and a vase, respectively.
Figure 8:
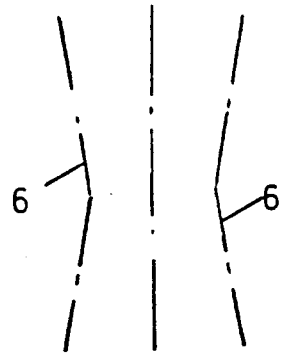
Figure 9:
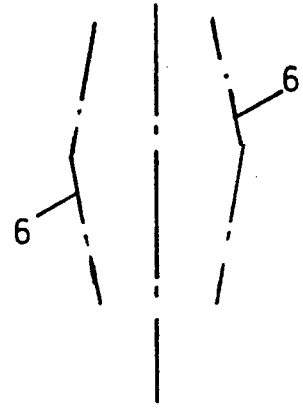

FIGS. 7-9 show schematically three different springs which similarly to the springs shown in FIGS. 1-6 have wave shaped walls, namely a spring shaped as a frustum of a cone, as an hour glass and as a vase. The dash and dot lines illustrate the cross section gravity lines for each spring seen in an axial plane traversing the two opposite cross sections of the spring in question. Said springs also constitute embodiments of the present invention. Since the neutral force surfaces extend parallel to the surfaces of said gravity lines, said neutral surfaces will also be shaped as shown in FIGS. 7 through 9 as a frustrum of a cone, an hour-glass and a vase, respectively.

I claim:

1. A spring for compression and tension comprising: a substantially cylindrical hollow body having a central longitudinal axis, opposite ends and a wall between said ends of substantially constant thickness and comprising at least two radially directed substantially U-shaped sections integrated to form spring parts and being symmetrical about said axis and functioning substantially in the axial direction, said U-shaped sections forming in cross-section radially outer and inner wave crests at respective inner and outer diameters, and said body being made of a material selected from the group consisting of metal, steel, glass, plastic, and reinforced plastic, and having a Young's modulus E of at least 39 GPa; and
an end section at each end comprising an annular rigid axial projection extending between said inner and outer wave-crest diameters so that a neutral surface of the spring passes through said end sections.

2. A spring as claimed in claim 1 wherein:
said wall has an average thickness; and
the ratio P=W:N for the entire length of the spring is in the range $1.5\% \leq P \geq 15\%$, where W is the average wall thickness and N is the diameter of said neutral surface in that part of the spring length having the thickness W.

3. A spring as claimed in claim 2 wherein said neutral surface comprises a cylindrical surface.

4. A spring as claimed in claim 3 wherein the number of U-shaped sections extending radially outwardly of said neutral surface is one less than the number of U-shaped sections extending radially inwardly of said neutral surface.

5. A spring as claimed in claim 3 comprising one U-shaped section extending radially outwardly of said neutral surface and two U-shaped sections extending radially inwardly of said neutral surface.

6. A spring as claimed in claim 1 wherein:
each spring part at said neutral surface forms an angle to said central axis of $90° \pm 5°$.

7. A spring as claimed in claim 1 wherein said neutral surface comprises a cylindrical surface.

8. A spring as claimed in claim 1 wherein said neutral surface comprises a conical surface.

9. A spring as claimed in claim 1 wherein said neutral surface comprises a double conical surface, said conical surfaces having opposite inclinations so that said surfaces intersect each other.

10. A spring as claimed in claim 1 wherein the number of U-shaped sections extending radially outwardly of said neutral surface is one less than the number of U-shaped sections extending radially inwardly of said neutral surface.

11. A spring as claimed in claim 10 comprising one U-shaped section extending radially outwardly of said neutral surface and two U-shaped sections extending radially inwardly of said neutral surface.

12. A spring as claimed in claim 1 comprising two U-shaped sections oppositely directed so that both sections extend radially outwardly of said neutral surface and are integrated to form a slightly flattened toroid.

13. A spring as claimed in claim 1 wherein:
each spring part at said neutral surface forms an angle to said central axis of $86.4° \pm 0.5°/-0.1°$.

* * * * *